Aug. 2, 1966    W. H. ASHLEY    3,263,669
WAFERING MACHINE
Filed Jan. 30, 1963
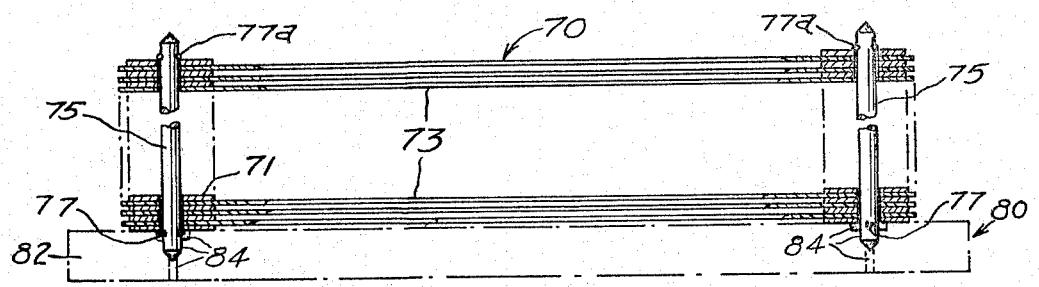
Fig. 1
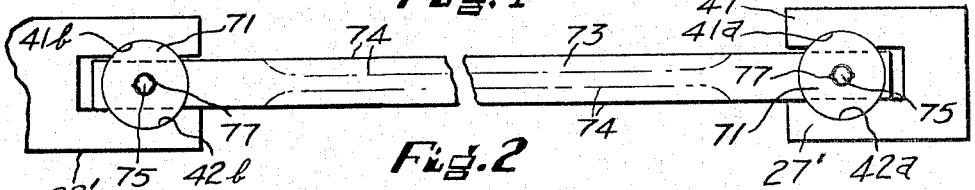
Fig. 2
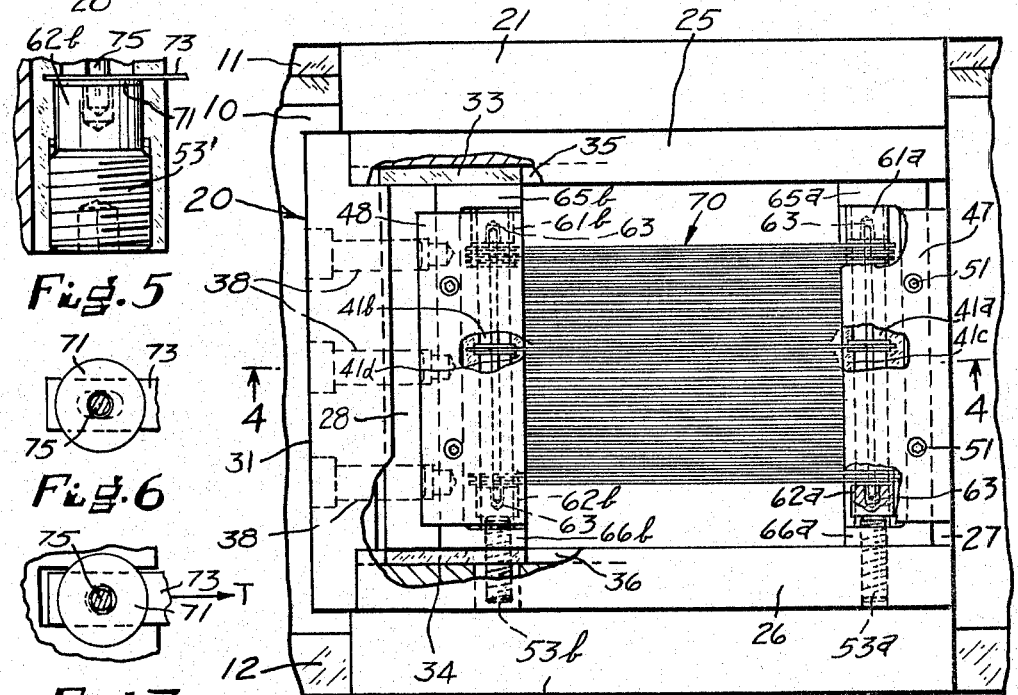
Fig. 5
Fig. 6
Fig. 7
Fig. 3
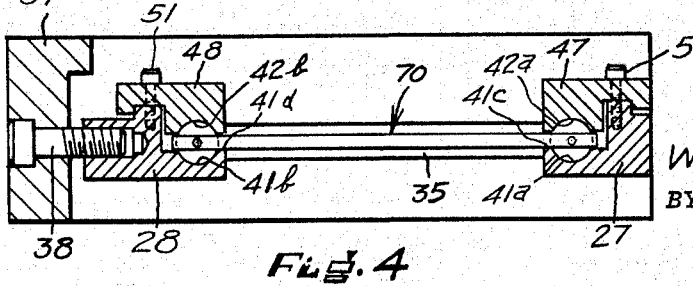
Fig. 4
INVENTOR.
WILLIAM H. ASHLEY
BY
Lewis M. Smith Jr
ATTORNEY

United States Patent Office 3,263,669
Patented August 2, 1966

3,263,669
WAFERING MACHINE
William H. Ashley, Worcester, Mass., assignor to Norton Company, Worcester, Mass., a corporation of Massachusetts
Filed Jan. 30, 1963, Ser. No. 254,996
5 Claims. (Cl. 125—16)

The instant invention relates to improvements in wafering machines for cutting hard materials such as quartz, silicon, germanium and the like, and more particularly to improvements in the blade head assembly for such wafering machines including the provision of a blade package including multiple blades and intervening spacers fitted loosely onto spaced retaining means, so that the blades are individually adjustable within the blade head assembly for uniform blade tension.

While there are various types of wafering machines for cutting hard materials including machines arranged to be provided with a diamond wheel with a peripheral cutting edge and machines arranged to be provided with an annular diamond blade with an internal cutting edge, this application relates particularly to the type of wafering machine which may be described as a multiple blade power hacksaw, characterized by a reciprocating blade head assembly supporting a large number of closely spaced parallel blades.

In one embodiment described and illustrated in copending application Serial No. 70,997 of Grover C. Hunt, now Patent No. 3,079,908, the last named type of wafering machine comprises a base supporting a spaced pair of ways disposed in a horizontal plane and arranged to slidably support a blade head assembly for reciprocation by a suitable drive motor. This blade head assembly consists of a generally rectangular frame connected to and supported by members shaped and disposed for engagement with spaced parallel ways mounted on the base of a machine, and in turn arranged to support and tension a large plurality of closely spaced parallel blades comprising elongated sections of thin strip material. The respective blades are thus supported in spaced vertical planes parallel to the ways with their lower edges disposed in a horizontal plane for reciprocation in engagement with an ingot of hard material forced upwardly against the blades by suitable biasing means such as a lever pivotally mounted intermediate its ends for rotation about a horizontal axis and arranged to support the hard material to be cut at one end thereof and an adjustable weight at the other end thereof.

The instant invention contemplates improvements in wafering machines of the type which may be described as multiple blade power hacksaws which derive from the incorporation in the blade head assembly of a preassembled multiple blade package combining blades and spacers into a single unit for insertion into and removal from the blade head assembly in such a manner that the respective blades remain subject to individual adjustment in the blade head assembly so that the blades may be uniformly tensioned thereby. The instant invention further contemplates a method of fabricating such multiple blade packages of various sizes rapidly and economically.

An object of this invention is the provision of a blade head assembly for a wafering machine arranged to accommodate the rapid installation therein of a unitary assembly comprising a multiplicity of loosely supported blades and intervening spacers subject to the displacement of individual blades relative to adjoining spacers as the blade head assembly is manipulated to tension the several blades uniformly.

Another object of this invention is to provide a preassembled blade package for quick and convenient installation in and removal from the blade head assembly of a wafering machine, which package consists of a multiplicity of elongated blades and of spacer elements fitted onto and secured by spaced retaining means so that they are not fully constrained, but are maintained substantially in the desired spaced parallel relationship.

A further object of this invention is the provision of a unitary blade package including multiple spaced elongated blades supported for individual alignment and tensioning within the blade head assembly of a wafering machine so that uniform tensioning of the respective blades is assured.

Still another object is the provision of retaining means for a multiplicity of elongated blades and for two series of spacers interfitted between the opposite ends of the respective blades, which retaining means engage the respective blades and spacers with sufficient clearance that the respective spacers may be uniformly aligned within the jaws of the blade head assembly of a wafering machane and the respective blades may be uniformly tensioned within the blade head assembly by individual adjustment of the respective blades without interference from the retaining means.

A final object of this invention is the provision of a method for fabricating a unitary blade package for the blade head assembly of a wafering machine so that the multiplicity of saw blades and the multiplicity of spacers included in such a blade package are individually adjustable relative to adjacent elements of the blade package when a blade package manufactured according to this method is inserted in the blade head assembly of a wafering machine.

Other objects and advantages of the instant invention will be apparent from consideration of the following description in relation to the showing in the accompanying drawings wherein:

FIG. 1 is a view of a representative blade package fabricated according to the teachings of the instant invention;

FIG. 2 is a side elevation of a reversible blade package fabricated according to the teachings of the instant invention indicating in dot-dash lines different designs of the supporting and tensioning members by means of which the package may be mounted in the blade head assembly of a wafering machine;

FIG. 3 is a plan view of the blade head assembly of the instant invention; and

FIG. 4 is a vertical section taken on line 4—4 of FIG. 3.

Referring now to the drawings wherein the respective numerals refer to like or corresponding parts, FIG. 3 illustrates a blade head assembly generally designated by the reference numeral 20 provided with a V-slide 21 and a flat-slide 22 respectively disposed in sliding engagement with a V-way 11 and a flat-way 12 secured to the horizontal upper surface of the base 10 of a multiple blade wafering machine. The blade head assembly 20 includes a first longitudinal frame member 25 and a second longitudinal frame member 26 to which the respective slides 21 and 22 are fixedly secured by suitable attachment means such as machine screws, not shown, in order to simplify the showing in FIG. 3. The respective longitudinal frame members 25 and 26 are interconnected at one end by a first transverse member comprising a first end frame member 27 and at the other end by a second transverse member comprising a bridging member 21.

A second end frame member 28 cooperating with the first end frame member 27 to align, support, and tension a blade package 70 is supported transversely of the blade head assembly 20 adjacent to but spaced from the bridging member 31. The end frame member 28 may be supported in sliding relation to the longitudinal frame members 25 and 26 by guides 33 and 34 projecting from the opposite ends thereof and slidable in channels 35 and 36 in the respective longitudinal frame members 25 and 26. With a blade package 70 supported in the blade head assembly 20 in the manner described in detail further below, the second end frame member 28 is adjustably positioned in relation to the bridging member 31 by suitable connecting means such as one or more machine screws 38 seated and rotatable within suitable recesses in the bridging member 31 and threadably engaged with the second end frame member 28. As illustrated in FIG. 3, the blade head assembly includes three screws 38 supported by the bridging member 31 and threadably engaging the end frame member 28.

The means for supporting a blade package in the blade head assembly 20 as illustrated in FIGS. 3 and 4, includes first and second pairs of blade supporting and tensioning jaws and first and second pairs of transverse clamp members operatively engaging the respective ends of blade package 70.

The first pair of blade supporting and tensioning jaws consists of a lower jaw 41a which may be formed integrally with the first end frame member 27 and an upper jaw 42a which may be formed integrally with a first cap member 47 which is releasably secured to the first end frame member 27 by a plurality of cap screws 51 as shown best in FIG. 4. The second pair of blade supporting and tensioning jaws consists of a lower jaw 41b which may be formed integrally with the second end frame member 28 and an upper jaw 42b which may be formed integrally with a second cap member 48 releasably secured to the second end frame member 28 by a plurality of cap screws 51 as shown best in FIG. 4. From the showing in FIGS. 2 and 4, it will be noted that the respective pairs of blade supporting and tensioning jaws are preferably shaped so that the opposed surfaces of these jaws conform to the opposed portions of the periphery of the circular spacers 71 disposed therebetween.

The first pair of transverse clamp members consists of a first block 61a disposed within the opening formed by the first pair of jaws 41a and 42a and against the surface of a projecting side portion 65a of the end frame member 27, and a second block 62a positioned between the first pair of jaws 41a and 42a by an adjusting screw 53a extending through a suitable opening in longitudinal frame member 26 as shown in FIG. 3 and threadably engaged at least with the projecting side portion 66a of the end frame member 27.

The second pair of transverse clamp members consists of a block 61b disposed within the opening formed by the second pair of jaws 41b and 42b and against the projecting side portion 65b of the end frame member 28, and a second block 62b positioned between the second pair of jaws 41b and 42b by an adjusting screw 53b extending through an enlarged clearance hole in the longitudinal frame member 26 and threadably engaged with the projecting side portion 66b of the end frame member 28 as shown in FIG. 6.

The blocks 61a, 61b, 62a and 62b shown best in FIG. 3 comprise cylindrical elements of substantially the same diameter as the spacers 71 so that they may be seated in sliding engagement with the respective pairs of jaws by which they are supported. Each of these blocks is provided with a central opening therein shaped to receive and freely accommodate one end of a retaining pin or the like projecting from a blade package.

As indicated in FIG. 2, the supporting and tensioning jaws may be formed in end frame members 27' and 28' of one piece construction each of which has a circular transverse bore sized to accommodate the spacers 71 and intersected by a slot slightly wider than the blades 73 accommodated therein. In such a configuration, the blade package can be installed from one side of a blade head assembly 20, provided that the longitudinal member 26 is provided with a slot lengthwise thereof shaped and positioned to received a blade package being inserted into the blade head assembly. The provision of such a slot with the necessary clearance for a blade package requires the elimination of the projecting side portions 66a and 66b in favor of modified supports for the adjusting screws in turn engaged by modified adjusting screws. For example, referring to FIG. 5, these modified supports might conveniently consist of internally threaded seats in the respective one piece end frame members 27' and 28' concentric of and slightly largely in diameter than the respective transverse bores, each such seat being engaged by an adjusting screw 53' of larger diameter than the screws 53a and 53b illustrated in FIG. 3.

As best illustrated in FIG. 1, the assembled blade package generally designated by reference numeral 70 incorporated in the blade head assembly 20 of the instant invention consists of first and second spaced series of substantially identical circular thin flat spacers 71 with central holes therethrough and a multiplicity of identical elongated relatively narrow blades 73 of thin strip material with their respective ends disposed between and retained adjacent adjoining spacers 71 of the respective series of spacers by suitable retaining means such as the pair of spaced pins 75 illustrated in the drawings, each passing alternately through the central hole in a spacer 71 and through a hole adjacent one end of a blade 73, all of the blades 73 having substantially equally spaced pairs of holes therethrough adjacent their respective ends. In order to secure the blades and spacers on the pins, the pins are staked at 77 and 77a as indicated in the drawings or otherwise secured by upset heads, pressed fit collars or other suitable means of securing the blades and spacers.

The size of the holes through the spacers 71 and the blades 73 are selected to be sufficiently larger than the diameter of the pins 75 to provide at least a small circumferential clearance between the respective pins and the spacers and blades engaged thereby, as illustrated in FIG. 1. This clearance is provided not only to facilitate the assembly of the blade packages, but also to accommodate limited selective individual adjustment of various blades as the blade package is tensioned in the blade head assembly, so that the respective blades are uniformly tensioned.

Noting that the working edges of the respective blades are worn away to a substantial degree in use by interaction with a work piece in the presence of an abrasive slurry, the utility of such blades is limited by the amount of wear sufficient to reduce the minimum cross section area of each blade to the critical amount sufficient to withstand the tension force exerted on each blade by the adjustment of the second end frame member 28 within the blade head assembly 20. Thus, this critical minimum area is determined by the strength of the blade material, the thickness of the blade material, and the magnitude of the tension force applied to each blade. In order to achieve the most favorable distribution of the force applied to each blade as the critical minimum cross section area is approached due to wear of the working edge 74, the blades may conveniently be fabricated from stock of sufficient initial width between the respective working edges 74, as illustrated in FIG. 2, so that the blades may be worn a predetermined amount on one side along a first working edge and then substantially the same predetermined amount on the other side along a second working edge by reversing the blade package in the blade head assembly so that a symmetrical configuration of each blade is approached as the safe minimum cross section area limiting blade use is approached.

Referring more particularly to the blade package characterizing the instant invention, the spacers 71 are manufactured to close tolerances from suitable metallic or other sheet material of uniform thickness so that all of the spacers 71 are substantially identical. While the peripheral shape of the spacers 71 is not critical, they may conveniently be made circular with centrally located circular holes therethrough as illustrated in the drawings so that their assembly in the blade package and the installation of the blade package in the blade head assembly do not depend upon angular orientation of the spacers.

The elongated blades 73 are manufactured to close tolerances from suitable metal strip material of uniform thickness and width so that they are substantially identical. Each of the elongated blades 73 is provided with a pair of holes therethrough adjacent the respective ends of the blade. The holes through the blades are equally spaced on each blade and at least one of these holes must be of a shape and size to accommodate limited lengthwise displacement of at least one end of each blade relative to the other blades in a blade package. For example, the holes through the blades 73 may be the same shape and size as the holes through the spacers 71. Alternatively, at least one of the holes through each blade may be elongated lengthwise of the blade to provide additional clearance, as shown in FIG. 6.

The retaining means for a blade package may include a pair of straight cylindrical pins or rods of metal or other suitable material. While the cross section shape of the pins 75 is not critical, they must be of a size which provides clearance between the pins 75 and the holes through the spacers 71 and the blades 73. As indicated above, the spacers 71 and the blades 73 may be secured loosely on the pins 75 by deforming the ends of pins 75 either by staking both ends of the respective pins 75 or by providing relatively enlarged heads upset on the ends of the pins 75, or otherwise enlarging the ends of pins 75 by means of collars pressed onto the ends of the pins 75 immovably positioned so that they confine but do not immobilize the assembled spacers and blades.

Retaining means such as the pins 75 so secured serve on one hand as the means of maintaining a multiplicity of blades 73 and associated spacers 71 in a unitary blade package 70 suitable for rapid installation in and removal from the blade head assembly 20 of a wafering machine, yet on the other hand do not interfere with the uniform tensioning of the respective blades in the blade head assembly by the process described in copending application Ser. No. 70,997 since the individual blades and spacers are not fully constrained within the package.

The procedure for the assembly of the blade package 70 described and illustrated herein is simplified by the fact that there is no need for the precise alignment of the blades and spacers as they are assembled, since the precise positioning and the uniform tensioning of the blades can be accomplished after the blade package has been installed in the blade head assembly as well as if the blades and spacers were separately installed in the blade head assembly.

The blade package 70 may be assembled on a simple jig assembly 80 consisting of a flat plate 82 provided with a pair of holes 84 shaped to receive the ends of a pair of pins 75 and also to accommodate suitable securing means such as the stakes 77. Pins 75 supported in the holes 84 are preferably disposed on parallel substantially vertical axes so that they are spaced apart a distance equal to the distance between the pair of holes through each blade 73. Thereafter, pairs of spacers 71 and blades 73 are stacked alternately on the pins 75 until a stack of blades of the desired width is completed. Before the blade package 70 is removed from the plate 82, each of the pins 75 is staked at 77a or otherwise secured to the assembled blades and spacers to form a blade package.

In order to prepare a blade head assembly 20 for a cutting operation, the pre-assembled blade package 70 is installed in the blade head assembly as shown in FIGS. 3 and 4 with the ends of the pins 75 disposed within the respective blocks 61a, 61b, 62a, and 62b.

Before the procedure for precisely positioning and uniformly tensioning the blades is undertaken, the adjustable end frame member 28 preferably should be positioned relative to the fixed end frame member 27 so that the respective series of spacers 71 at the opposite ends of the blade package are displaced toward each other as indicated in the showing in FIG. 7. With this arrangement, the maximum amount of clearance between the holes in the spacers 71 and the pins 75 and thence between the pins 75 and the holes in the blades 73 is available to accommodate relative displacement of individual blades 73 as necessary in response to a tension load applied as indicated by the arrow T in FIG. 7, in order to achieve uniform tension on the blades. In practice, the required clearance between the pins 75 and the holes in the blades 73 and spacers 71 may be relatively small in view of the fact that the relative displacement of individual blades necessary to achieve uniform tension on the several blades normally will be very small when the blades and spacers have been fabricated to close tolerances. However, it remains essential to provide sufficient effective clearance between the blades and spacers and the pins so that the pins play no part in securing and tensioning the blades 73 in the blade head assembly 20.

The blades 73 are uniformly tensioned in the blade head assembly 20 by first tightening the screws 53a and 53b so that the blades 73 and spacers 71 are positioned precisely within the blade head assembly and clamped together lightly subject to slippage of the more heavily tensioned blades when the initial tension load is applied by tightening the screws 38 to displace the end frame member 28. Thereafter, the screws 53a and 53b are tightened sufficiently to immobolize the ends of the blades 73 relative to the spacers 71 under the full tension load solely by friction and without interference from the pins 75. Finally the desired tension load on the blades 73 is applied by further tightening the respective screws 38.

The apparatus disclosed herein simplifies the operation of a wafering machine in several important respects. The original installation and the periodic replacement of a large number of blades is facilitated by the provision of a blade head assembly arranged to incorporate a unitary blade package comprising loosely interconnected blades and spacers. The fabrication of a preassembled blade package is facilitated by the arrangement disclosed herein for combining blades and spacers loosely in a single blade package. The pre-assembled blade package may be checked readily on the commercially available optical inspection equipment commonly used for the critical inspection of precision parts. Finally the blades and spacers loosely interconnected in a single package may be aligned precisely in the blade head assembly and the respective blades can be uniformly tensioned by the blade head assembly in the same manner as separate blades individually installed in the blade head assembly between separate spacers individually installed.

Since various details of this invention are subject to modification, it is to be understood that the embodiment described above and illustrated in the accompanying drawings is to be interpreted as illustrative and not in a limiting sense, and that the scope of this invention is defined by the claims appended hereto.

What is claimed is:
1. A pre-assembled blade package for a wafering machine comprising
first and second substantially identical spaced elongated pins each of a predetermined uniform cylindrical cross section,
a plurality of substantially identical flat annular spacers of a predetermined relatively large transverse dimension and of uniform thickness each having an internal surface defining a central hole therethrough substantially larger than the cross section of said pins,
a multiplicity of substantially identical narrow elongated blades of a predetermined relatively small transverse dimension and of thin strip material of uniform thickness each having spaced internal surfaces adjacent the opposite ends thereof defining a pair of holes therethrough each substantially larger than the cross section of said pins, said elongated pins being passed alternately through pairs of spacers and through successive blades so that said blades and pairs of said spacers are assembled loosely in alternate interfitting engagement on said first and second pins with said spacers extending beyond both sides of said elongated blades, and said pins being deformed on the opposite ends thereof with the respective deformed portions on each of said pins so located with respect to each other as to maintain the alternate pairs of spacers and the blades interconnecting said pins loosely assembled lengthwise of said pins to form a unitary blade package composed of loosely constrained blades and spacers, whereby said blades may be precisely positioned and transversely clamped in a given blade head assembly by suitable transverse clamping means and said blades may be uniformly tensioned in the given blade head assembly by suitable opposed longitudinal tensioning means respectively engaging the portions of the pairs of said spacers extending beyond said blades notwithstanding the presence of said first and said second elongated pins.

2. A single unit blade package for a multiple blade wafering machine comprising a plurality of flat thin perforate spacers each having a predetermined relatively large transverse dimension arrayed in first and second spaced series, a multiplicity of elongated blades each having a predetermined relatively small transverse dimension and of thin flat strip material having perforate ends, each blade having one perforate end disposed between adjacent perforate spacers of the first series and the other perforate end disposed between adjacent perforate spacers of the second series so that said spacers extend beyond both sides of said elongated blades, a first elongated retaining means passing through and of a substantially smaller cross section than the perforations in said blades and spacers loosely interfitted with the spacers of the first series and the ends of blades disposed therebetween, both ends of said first retaining means being enlarged by deformation thereof to maintain said spacers of the first series and said blades in alternate array disposed loosely lengthwise of said first retaining means, a second elongated retaining means passing through and of a substantially smaller cross section than the perforations in said blades and spacers loosely interfitted with the spacers of the second series and the ends of blades disposed therebetween, and both ends of said second retaining means being enlarged by deformation thereof to maintain said spacers of the second series and said blades in alternate array and disposed loosely lengthwise of said second retaining means, whereby said blades may be precisely positioned and transversely clamped in a given blade head assembly by suitable transverse clamping means and said blades may be uniformly tensioned in the given blade head assembly by suitable opposed longitudinal tensioning means respectively engaging the portions of said first and said second series of spacers extending beyond said blades notwithstanding the presence of said first and said second elongated retaining means.

3. A blade head asesmbly for a multiple blade wafering machine comprising a generally rectangular supporting frame, a first blade package engaging means disposed transversely of one end of said supporting frame including a first pair of opposed releasable transverse clamp members, an adjustable supporting element disposed adjacent the other end of said supporting frame, a second blade package engaging means disposed transversely of said supporting frame and supported by said supporting element including a second pair of opposed releasable transverse clamp members, an elongated loosely pre-assembled multiple blade package secured transversely adjacent its opposite ends in said first pair of transverse clamping members and in said second pair of transverse clamping members respectively, said blade package including a plurality of flat thin annular spacer elements arrayed in first and second spaced series, and a multiplicity of elongated blades of thin flat strip material provided with a pair of holes through each blade adjacent the opposite ends thereof, each with one end disposed between adjacent spacer elements of the first series and the other end disposed between adjacent spacer elements of the second series, a first elongated retaining means passing through and loosely engaged by the first series of spacer elements and one end of each of said multiplicity of blades, a second elongated retaining means passing through and loosely engaged by the second series of spacer elements and the other end of each of said multiplicity of blades, and means on the respective ends of said first and said second retaining means to maintain said spacers and said blades on and loosely lengthwise of said retaining means, and adjustable coupling means interconnecting said supporting frame and said supporting element and operable to displace said supporting element longitudinally relative to said supporting frame to displace individual blades of said elongated multiple blade package selectively relative to adjacent spacer elements as necessary to tension the multiplicity of blades uniformly in said blade head assembly.

4. A blade head assembly for a multiple blade wafering machine comprising a generally rectangular supporting frame, a first blade package engaging means disposed transversely of one end of said supporting frame including a first pair of opposed elongated releasable jaws and a first pair of opposed releasable clamp members disposed adjacent the opposite ends of said first pair of jaws, an adjustable supporting element disposed adjacent the other end of said supporting frame, a second blade package engaging means disposed transversely of said supporting frame and supported by said supporting element including a second pair of opposed elongated releasable jaws and a second pair of opposed releasable clamp members, an elongated loosely pre-assembled multiple blade package engaged adjacent its opposite ends by said first pair of jaws and by said second pair of jaws respectively and clamped transversely adjacent its opposite ends by said first pair of clamping members and by said second pair of clamping members respectively, said blade package including a plurality of flat thin relatively wide annular spacer elements arrayed in first and second spaced series, a multiplicity of relatively narrow elongated blades of thin flat strip material each having a pair of holes therethrough adjacent the respective ends thereof, the respective blades being positioned with one end disposed between adjacent spacer elements of the first series and the other end disposed between adjacent spacer elements of the second series with the respective spacer elements projecting beyond both edges of the adjacent blades for engagement by said jaws, a first elongated retaining means passing through and loosely interfitted with the spacer elements of the first series and the ends of blades disposed therebetween, securing means connected to both ends of said first retaining means effective to maintain said spacer elements of the first series and said blades loosely on said first retaining means, a second elongated retaining means passing through and loosely interfitted with the spacer elements of the second series and the ends of blades disposed therebetween, and securing means connected to both ends of said second retaining means effective to maintain said spacer elements of the second series and said blades loosely on said second retaining means, and adjustable coupling means interconnecting said supporting frame and said supporting element and operable to displace said supporting element longitudinally relative to said supporting frame to displace respective blades of said elongated multiple blade package individually as necessary independent of said pins to tension the multiplicity of blades uniformly in said blade head assembly.

5. A method of assembling a unitary multiple blade package with blades individually adjustable in the blade head assembly of a wafering machine comprising providing each of first and second elongated pins with deformed relatively enlarged blade and spacer retaining means adjacent one end thereof, inserting one end of each of the first and second elongated pins in one of a pair of recesses in a common supporting means so that the first and second elongated pins are supported on parallel substantially vertical axes a predetermined distance apart, depositing a series of pairs of annular spacers loosely around the first and second elongated pins, respectively, and alternatively depositing a selected number of elongated blades with two holes therethrough said predetermined distance apart loosely over both the first and second elongated pins, and providing each of the first and second elongated pins with deformed relatively enlarged blade and spacer retaining means adjacent the other end thereof and so disposed that said pairs of spacers and said blades are loosely constrained lengthwise of said elongated members.

References Cited by the Examiner

UNITED STATES PATENTS

| 510,962 | 12/1893 | Deuter | 143—156 |
| 1,276,152 | 8/1918 | Woodward | 30—305 |
| 2,396,443 | 3/1946 | Singer | 30—304 |

FOREIGN PATENTS

| 570,624 | 2/1959 | Canada. |
| 106,804 | 6/1917 | Great Britain. |
| 36,115 | 11/1910 | Sweden. |

HAROLD D. WHITEHEAD, *Primary Examiner.*

FRANK H. BRONAUGH, LESTER M. SWINGLE,
*Examiners.*

J. E. PEELE, *Assistant Examiner.*